United States Patent
Whitehouse et al.

(10) Patent No.: US 10,669,996 B2
(45) Date of Patent: Jun. 2, 2020

(54) LIGHTNING PROTECTION SYSTEMS FOR WIND TURBINE BLADES

(71) Applicant: Vestas Wind Systems A/S, Aarhus N. (DK)

(72) Inventors: Daniel Whitehouse, Isle of Wight (GB); Richard Baker, Aarhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 502 days.

(21) Appl. No.: 15/029,889

(22) PCT Filed: Oct. 15, 2014

(86) PCT No.: PCT/DK2014/050335
§ 371 (c)(1),
(2) Date: Apr. 15, 2016

(87) PCT Pub. No.: WO2015/055215
PCT Pub. Date: Apr. 23, 2015

(65) Prior Publication Data
US 2016/0298608 A1    Oct. 13, 2016

(30) Foreign Application Priority Data
Oct. 17, 2013  (GB) .................................. 1318383.5

(51) Int. Cl.
*F03D 80/30* (2016.01)
*F03D 1/06* (2006.01)
*H01B 13/00* (2006.01)

(52) U.S. Cl.
CPC ........... *F03D 80/30* (2016.05); *F03D 1/0675* (2013.01); *H01B 13/0036* (2013.01);
(Continued)

(58) Field of Classification Search
CPC .................................................. F05B 2280/10
See application file for complete search history.

(56) References Cited

U.S. PATENT DOCUMENTS 7,651,320 B2 *  1/2010  Hansen ................. H02G 13/00
                                                416/1
7,766,620 B2    8/2010  Stam et al.
(Continued)

FOREIGN PATENT DOCUMENTS

CN    201991708 U    9/2011
CN    103250314 A    8/2013
(Continued)

OTHER PUBLICATIONS

Machine translation of WO 2013/084634 to Fujioka, published Jun. 13, 2013 (Year: 2013).*
(Continued)

*Primary Examiner* — Igor Kershteyn
*Assistant Examiner* — Jason G Davis
(74) *Attorney, Agent, or Firm* — Wood Herron & Evans LLP

(57) ABSTRACT

A method of making a wind turbine blade component incorporating a lightning protection system, the method comprising: providing a mould surface; arranging a forming element on the mould surface; providing an electrically conductive layer; reinforcing the electrically conductive layer in a predetermined region to create a reinforced zone; arranging the electrically conductive layer over the forming element so that the reinforced zone is superimposed on the forming element; arranging one or more structural components on the electrically conductive layer; consolidating the structural components under vacuum to form a blade shell having an integrated electrically conductive layer adjacent an outer surface of the shell; removing at least part of the forming element from the blade shell to define a recess in the outer surface of the shell so as to expose the reinforced zone of the electrically conductive layer; electrically connecting the electrically conductive layer at the reinforced zones to a (Continued)

respective electrical component located adjacent an inner surface of the blade shell. The invention also extends to a preformed component for use in fabricating a wind turbine blade.

27 Claims, 10 Drawing Sheets

(52) U.S. Cl.
CPC ....... *F05B 2230/50* (2013.01); *F05B 2230/60* (2013.01); *F05B 2280/10* (2013.01); *Y02E 10/721* (2013.01); *Y02E 10/726* (2013.01); *Y02P 70/523* (2015.11)

(56) References Cited

U.S. PATENT DOCUMENTS

| | | | |
|---|---|---|---|
| 7,938,625 B2 | 5/2011 | Dahl et al. | |
| 8,182,227 B2* | 5/2012 | Jacobsen | F03D 1/0675 416/146 R |
| 8,191,255 B2* | 6/2012 | Kristensen | F03D 80/30 29/889.71 |
| 2006/0280613 A1 | 12/2006 | Hansen | |
| 2007/0081900 A1 | 4/2007 | Nies | |
| 2009/0257882 A1 | 10/2009 | Olsen | |
| 2011/0142678 A1 | 6/2011 | Santiago et al. | |
| 2011/0182731 A1 | 7/2011 | Naka et al. | |
| 2012/0133146 A1 | 5/2012 | Naka et al. | |
| 2013/0078105 A1 | 3/2013 | Drewes et al. | |
| 2013/0149153 A1* | 6/2013 | Fujioka | H02G 13/00 416/146 R |
| 2013/0149154 A1 | 6/2013 | Kuroiwa et al. | |
| 2014/0301859 A1* | 10/2014 | Hancock | F03D 1/0675 416/230 |

FOREIGN PATENT DOCUMENTS

| | | |
|---|---|---|
| DE | 102008007910 A1 | 8/2008 |
| EP | 1011182 A1 | 6/2000 |
| EP | 2110552 A1 | 10/2009 |
| EP | 2226497 A1 | 9/2010 |
| EP | 2395239 A1 | 12/2011 |
| EP | 2532893 A1 | 12/2012 |
| WO | 2007062659 A1 | 6/2007 |
| WO | 2007128314 A1 | 11/2007 |
| WO | 2008006377 A1 | 1/2008 |
| WO | 2011080177 A1 | 7/2011 |
| WO | 2013084634 A1 | 6/2013 |
| WO | 2013097855 A2 | 7/2013 |

OTHER PUBLICATIONS

Intellectual Property Office, Search and Examination Report issued in Application No. GB1318383.5 dated Jun. 30, 2014.
European Patent Office, International Search Report and Written Opinion issued in International Patent Application No. PCT/DK2014/050335 dated Dec. 5, 2014.
Intellectual Property Office, Search Report issued in Application No. GB1318382.7 dated Apr. 30, 2014.
European Patent Office, International Search Report and Written Opinion issued in International Patent Application No. PCT/DK2014/050334 dated Dec. 11, 2014.
Intellectual Property Office, Search and Examination Report issued in Application No. GB1318381.9 dated May 22, 2014.
European Patent Office, International Search Report and Written Opinion issued in International Patent Application No. PCT/DK2014/050333 dated Dec. 12, 2014.
European Patent Office, Examination Report in EP 14786796.4, dated Nov. 15, 2018.
The State Intellectual Property Office of China, First Notification of Office Action in CN Application No. 201480068986.4, dated Mar. 13, 2018.
Government of India, Examination Report in IN Application No. 201617015702, dated May 17, 2019.

* cited by examiner

LIGHTNING PROTECTION SYSTEMS FOR WIND TURBINE BLADES

TECHNICAL FIELD

The present invention relates to wind turbine blade structures and associated fabrication processes for improving the resilience of wind turbine blades to lightning strikes. The invention also extends to preformed components for use in such wind turbine blades, and methods for fabricating such preformed components.

BACKGROUND

Wind turbines are vulnerable to being struck by lightning; sometimes on the tower, nacelle and the rotor hub, but most commonly on the blades of the turbine. A lightning strike event has the potential to cause physical damage to the turbine blades and also electrical damage to the internal control systems of the wind turbine. Wind turbines are often installed in wide open spaces which makes lightning strikes a common occurrence. Accordingly, in recent years much effort has been made by wind turbine manufacturers to design wind turbines so that they are able to manage effectively the energy imparted to them during a lightning strike in order to avoid damage to the blade and the cost associated with turbine down-time during blade replacement.

In general, lightning protection systems for wind turbine blades are known. In one example, an electrically conductive lightning receptor element is arranged on an outer surface of the blade to receive a lighting strike. Since the receptor element is electrically conductive, lightning is more likely to attach to the receptor element in preference to the relatively non-conductive material of the blade. The receptor element is connected to a cable or 'down conductor' that extends inside the blade to the root and from there connects via an armature arrangement to a charge transfer route in the hub, nacelle and tower to a ground potential. Such a lightning protection system therefore allows lightning to be channelled from the blade to a ground potential safely, thereby minimising the risk of damage. However, the discrete receptors are relatively complex to install during fabrication of the blade and, moreover, they leave a significant portion of blade area exposed to a risk of lightning strike.

Such a receptor arrangement provides discrete conductive points to which lightning may attach. To increase the effectiveness of such a system, US2011/0182731 describes a wind turbine blade having a conductive layer that is laid over the outer surface of the blade shell so as to make contact with the receptor elements. The conductive layer increases the area of the blade that can receive lightning, thereby increasing the rate at which the receptor elements can capture lightning strikes safely. Although a conductive layer used in this way can be said to increase the capability of the lightning protection system to intercept lightning strikes, such a system can be complex to manufacture since the conductive layer must be added to the blade after the blade shell has been fabricated. This requires an additional time-consuming manufacturing step thereby increasing assembly time and cost.

It is against this context that the invention has been devised.

SUMMARY OF THE INVENTION

In a first aspect, the invention provides a method of making a wind turbine blade component incorporating a lightning protection system, the method comprising: providing a mould surface; arranging a forming element on the mould surface; providing an electrically conductive layer, and reinforcing the electrically conductive layer in a predetermined region to create a reinforced zone. Then, the electrically conductive layer is arranged over the forming element so that the reinforced zone is superimposed on the forming element; and one or more structural components are arranged on the electrically conductive layer. The structural layers may include further composite-suitable layers such as GRP fabrics. The structural components are then consolidated under vacuum to form a blade shell having an integrated electrically conductive layer adjacent an outer surface of the shell, wherein the method includes removing at least part of the forming element from the blade shell to define a recess in the outer surface of the shell so as to expose the reinforced zone of the electrically conductive layer. Finally, the electrically conductive layer is electrically connected at the reinforced zones to a respective electrical component located adjacent an inner surface of the blade shell.

The reinforcing of the conductive layer in a predetermined zone or region, or a plurality of such zones, optimises the electrical contact between the conductive layer and the electrical component.

To simplify the assembly process, the conductive layer may be provided as a preformed component for arranging on the mould. In this case, the forming element could also be provided as part of the preformed component.

The reinforced zone may be established by applying a conductive element, such as a metal plate or disc to one or both sides of the conductive layer. The conductive elements may be applied by a suitable technique such as being fused to the conductive layer by brazing, welding, or casting for example.

To allow the reinforced zone to be accessed for electrical connection, the forming element may be provided with a removable element which, when removed, exposes the underlying reinforced zone. However, during the consolidation phase, the removable element beneficially protects the conductive layer from being infused with resin.

The conductive layer may be any suitable thin sheet-like conductor such as metallic foil or a mesh. However, an expanded metal foil, of copper or aluminium for example, strikes a good balance between electrical conductivity, robustness, weight and cost.

In order to connect the conductive layer to the electrical component, a connector element may be received through the conductive layer, for example by drilling a hole for its passage. The connector element may be provided with a flat face for mating with a correspondingly flat surface of the reinforced zone which results in a robust electrical contact.

As has been discussed, the conductive layer may be formed as a preformed component for laying up in a suitable mould. Therefore, in a second aspect, the invention also resides in a preformed component for a lightning protection system of a wind turbine blade, wherein the preformed component comprises a conductive layer including reinforcing means arranged to reinforce the conductive layer in one or more discrete reinforced zones.

The reinforcing means may include at least one reinforcing element applied to the conductive layer in a respective one or more locations so as to form one or more reinforced zones. The reinforcing element may be formed by applying a conductive material such as solder to the conductive layer to thicken the layer in localised areas or, alternatively, a reinforcing element such as a metallic plate or disc may be bonded or fused to the conductive layer.

The preformed component may also include a forming element superimposed on the reinforced zone that helps to shape the preformed component as appropriate for receiving a receptor element. The forming element may include a removable plug that seals against the reinforced zone to prevent intrusion of resin. However, the plug can be removed to allow access to the underlying conductive layer.

To assist technicians in locating the forming elements once the blade has been formed, the forming element may include locating means, preferably in the form of a magnet embedded in the plug, although other means are acceptable.

Preferred and/or optional features of the first aspect of the invention may be combined with other aspects of the invention and vice versa. The invention in its various aspects is defined in the independent claims below and advantageous features are defined in the dependent claims below.

BRIEF DESCRIPTION OF THE DRAWINGS

For a fuller understanding of the invention, some embodiments of the invention will now be described with reference to the following drawings, in which.

DETAILED DESCRIPTION

Figure 1:
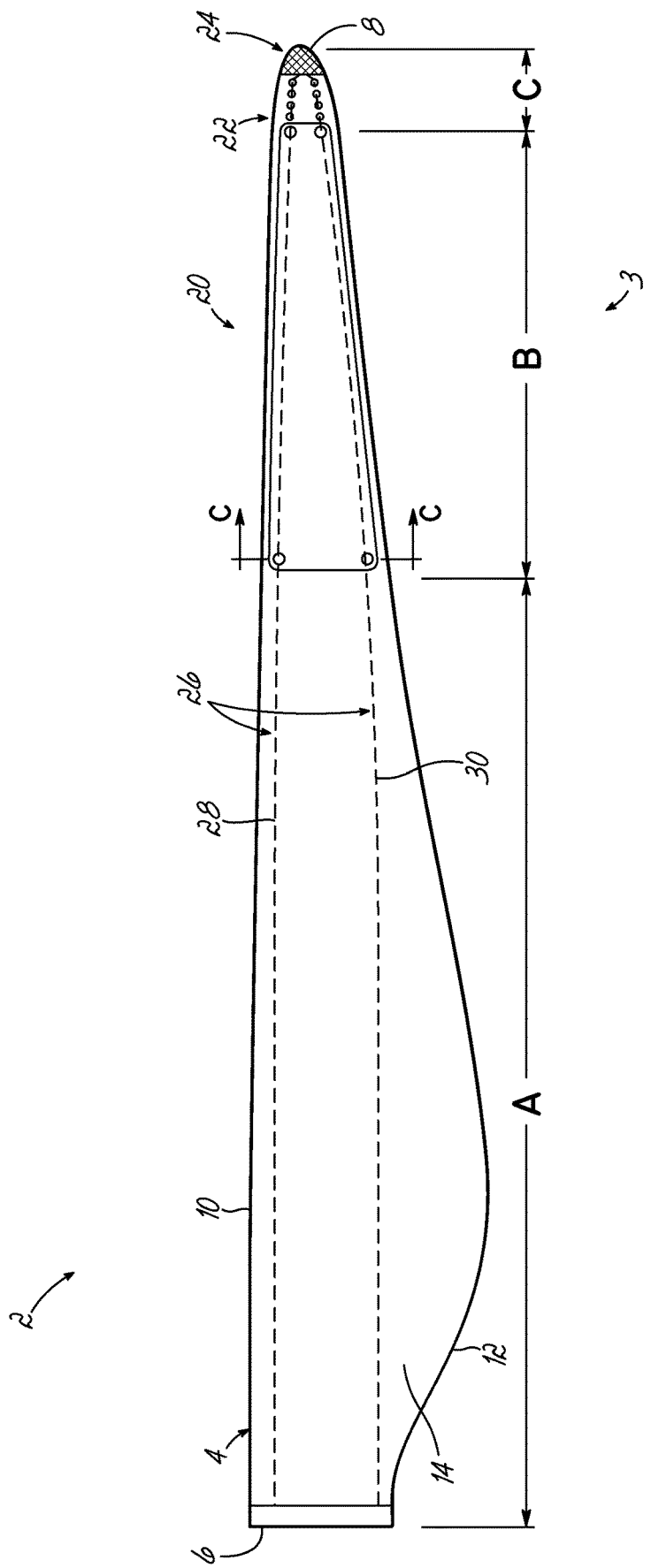
FIG. 1 is a plan view of a wind turbine blade equipped with a lightning protection system.

With reference to FIG. 1, a wind turbine blade 2 incorporates a lightning protection system 3. The blade 2 is formed from a blade shell 4 having two half-shells. The half-shells are typically moulded mainly from glass-fibre reinforced plastic (known as 'GFRP' or, simply 'GRP') that comprises glass fibre fabric embedded in a cured resin matrix. The precise construction of the blade shell 4 is not central to the invention and so further detailed description is omitted for clarity.

The blade comprises a root end 6, at which the blade 2 would be attached to a rotor hub of a wind turbine, a tip end 8, a leading edge 10 and a trailing edge 12. A first surface 14 of the blade 2 defines an aerodynamic profiled surface that extends between the leading edge 10 and the trailing edge 12. The blade 2 also includes a second surface also extending between the leading edge 10 and trailing edge 12, which is not shown in the plan view of FIG. 1, but which is indicated as reference numeral 16 in FIGS. 3 and 4, for example.

When the blade 2 is attached to a rotor hub of a wind turbine, airflow strikes the surface 16 of the blade 2 and for this reason the surface 16 is also referred to as a 'pressure side' or 'windward side' in the art. Conversely, the surface 14 is referred to as the 'suction side' or 'leeward side'.

Turning to the lightning protection system 3, this is based on a 'zoning' concept in which the blade 2 is demarcated in a longitudinal or 'span-wise' direction into regions or 'zones' depending on the probability of receiving a lightning strike in that region. A similar principle is described in WO2013/007267.

In this embodiment, the blade 2 is divided into three zones for the purposes of lightning protection—these are illustrated in FIG. 1 as zones A, B and C. The lightning protection apparatus that is used in each of the zones is selected based on a set of lightning strike parameters, such as peak current amplitude, impulse current, specific energy, impulse shape and total charge that the blade 2 is expected to withstand in each of the zones. A brief explanation of the different zones now follows, by way of example.

Zone A extends from the root end 6 of the blade to approximately 60% of the blade length in the span-wise direction. In this zone, the blade 2 has a low risk of a lightning strike and so will be expected to receive a low incident of strikes at low current amplitudes, and low total charge transfer, which is acceptable for blade structural impact. In this embodiment, the blade 2 is not equipped with any external lightning protection within this zone.

Zone B extends from the end of zone A to approximately 90% of the blade length in a span-wise direction. In this zone the blade 2 has a moderate risk of lightning strike and is expected to withstand moderately frequent direct lightning strike attachments having increased impulse current, peak current and total charge transfer. Accordingly, the blade 2 is provided with a first lightning protection sub-system 20 in the form of a surface protection layer 20.

Finally, zone C extends from the end of zone B to the tip end 8 of the blade 2. In this zone the blade 2 is subject to a high likelihood of lightning strikes and is expected to withstand peak current amplitudes of in excess of 200 kA and total charge transfer in excess of 300 coulomb and, moreover, a high incident of strikes. To provide the required level of protection for the blade, zone C includes two further lightning protection sub-systems. Firstly, there is provided an array of receptors (hereinafter 'receptor array') 22 and, secondly, there is provided a blade tip assembly 24. Both the receptor array 22 and the blade tip assembly 24 are electrically connected to a down conducting system 26, comprising first and second down conductors 28, 30 running along the length of the blade 2 from the tip end 8 to the root end 6, generally being arranged adjacent the leading edge 10 and trailing edge 12 of the blade 2, respectively. Although an overview of the receptor array 22 and the blade tip assembly 24 has been provided here for completeness, they are not central to the inventive concept and so further explanation will be omitted.

Detailed discussion will now turn to the surface protection layer 20. As has been mentioned, the surface protection layer 20 is in zone B and comprises a conductive layer that is integrated into both the upper half-shell and the lower half-shell of the blade 2. The conductive layer may be a metallic screen or mesh, and preferably a mesh/screen in the form of an expanded metal foil that acts to attract lightning strikes over a large area of the blade and which is connected to the down conducting system 26 in a manner that will be described. The thickness of the conductive layer is such that the aerodynamic profile of the blade 2 is unaffected and so it is preferred that the conductive layer is less than 5 mm in thickness. It is currently envisaged that the conductive layer is less than 1 mm in thickness, preferably 0.3 mm. In principle, an expanded foil of any metallic material is acceptable as long as it provides the necessary current-carrying and charge dissipation capability, although aluminium and copper foils are currently preferred.

Figure 2:
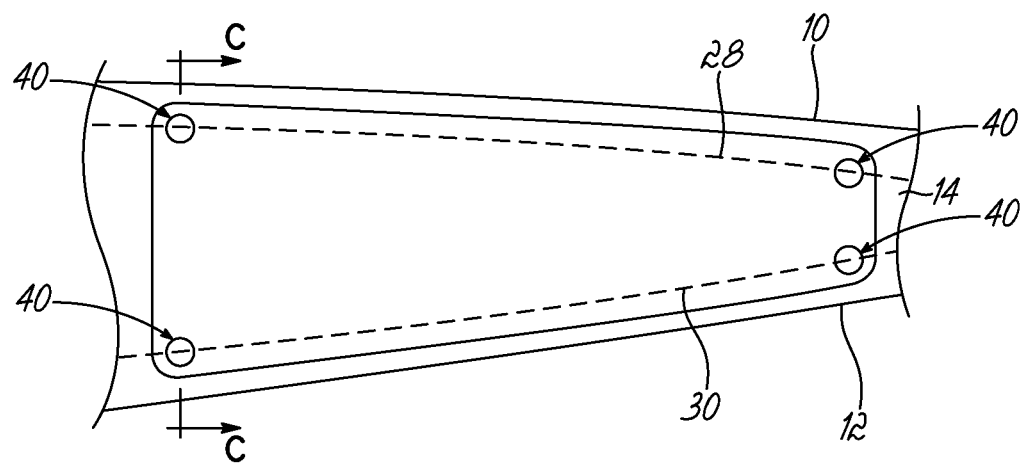
FIG. 2 is an enlarged view of a region of the turbine blade in FIG. 1, that illustrates a surface protection layer of the lightning protection system.

FIG. 2 shows the surface protection layer 20 in more detail, although not to scale. Here it can be seen that the surface protection layer 20 is connected to the down conductors 28, 30 by a plurality of connector arrangements 40. Four connector arrangements 40 are shown in this view of the surface of the blade 2, two being adjacent the leading edge 10 of the blade and two being adjacent the trailing edge 12 of the blade 2.

Figure 3:
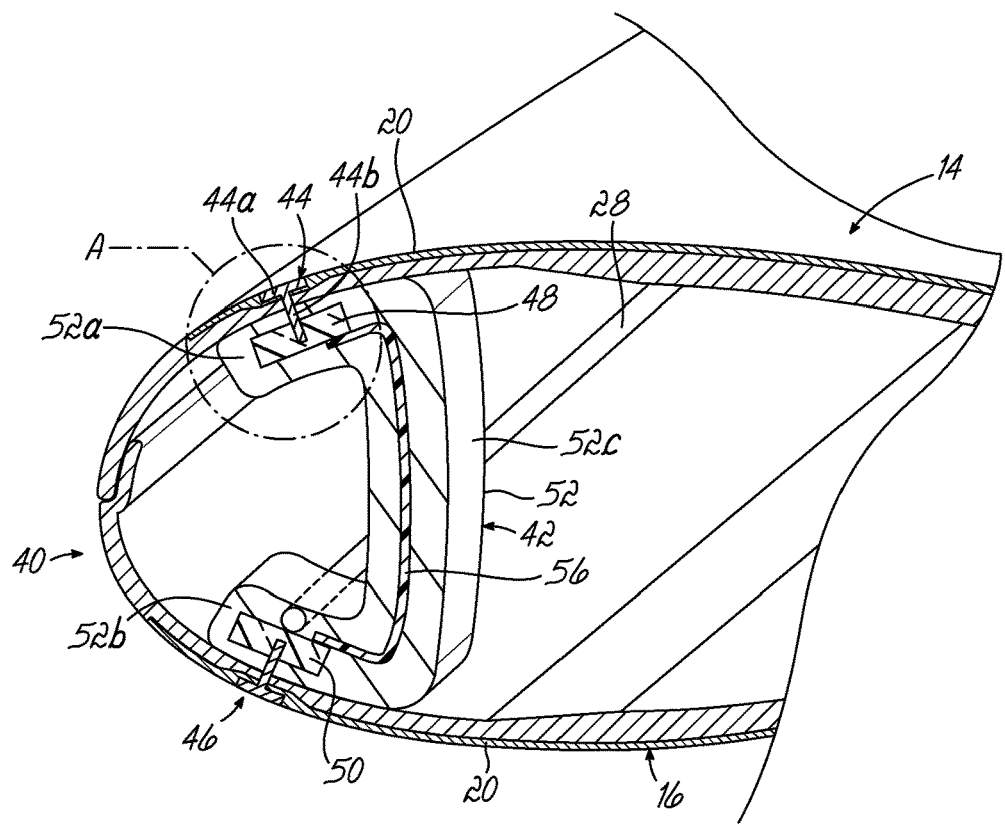
FIG. 3 is a section through a leading edge region of the turbine blade in FIG. 2 along the line C-C.
Figure 4:
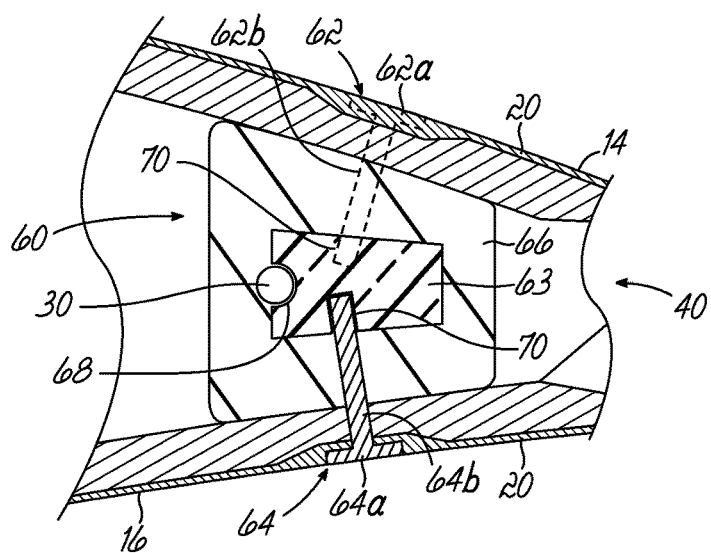
FIG. 4 is a section through a trailing edge region of the turbine blade in FIG. 2 along the line C-C.

FIG. 3 shows a leading edge connector arrangement 40 in more detail and FIG. 4 shows a trailing edge connector arrangement 40 in more detail.

With reference firstly to FIG. 3, the connector arrangement 40 includes a block-like connector component 42 that is shaped to fill the volume in the relatively deep profile of this region of the blade 2 and provide an electrical connection to a first connector element 44 associated with the leeward surface 14 and a second connector element 46 associated with the windward surface 16.

The connector component 42 comprises first and second connector bases 48, 50 that are encapsulated by an insulating member 52 that is generally annular in form. The insulating member 52 is moulded directly to the connector bases 48, 50 and so serves to suppress the initiation of ionization and streamers during highly charged environmental conditions, which thereby guards against a lightning strike directly onto the connector bases 48, 50 rather than on a connector element 44, 46. The insulating member 52 is formed of a suitable polymer having a high dielectric strength, and it is envisaged that the insulating member will be polyurethane for its good dielectric properties and low cost, although other insulating materials are acceptable.

In more detail, the insulating member 52 is generally C-shaped, and is defined by first and second arm portions 52a, 52b that extend from each end of a yoke portion 52c. Each of the connector bases 48, 50 is encapsulated by a respective one of the arm portions 52a, 52b and in this manner the connector bases 48, 50 are located in a predetermined position against a respective leeward 14 and windward surface 16 of the blade 2. The connector bases 48, 50 are conductive, preferably brass for its high conductivity, corrosion resistance, and drillability although other metals or alloys would be acceptable.

The first connector element 44 electrically couples the surface protection layer 20 on the leeward surface 14 to the first connector base 48. Similarly, the second connector element 46 couples the surface protection layer 20 on the windward surface 16 to the second connector base 50. The connector elements 44, 46 are identical so only one of them shall be described in detail. The first connector element 44 is in the form of a bolt having a head 44a and a shank 44b. Stainless steel is currently the preferred material for the bolt, although other conductive materials, particularly metals, are also acceptable. The shank 44b extends through the blade 2 and engages with the first connector base 48 by way of cooperating screw threads, and the head 44a is arranged to lie flush with the surrounding surface of the surface protection layer 20. Note that the underside of the head 44a is substantially flat so as to establish a robust electrical connection with the surface protection layer 20. An identical arrangement is provided to couple the surface protection layer 20 on the windward surface 16 to the second connector base 50.

A conductive link 56 is provided to electrically connect the first connector base 48 to the second connector base 50 and, in this embodiment, the conductive link 56 is a zinc coated copper braided wire. Although braided wire is not essential, it is useful from a manufacturing perspective since it is flexible and so can be suitably shaped to extend between the first and second connector bases 48, 50 prior to encapsulation by the insulating member 52.

Connection between the connector component 42 and the down conducting system 26 is made by welding the second connector base 50 to a corresponding down conductor, which as illustrated is the first down conductor 28 near the leading edge 10 of the blade 2. For efficient assembly, the conductive link 56 and the down conductor 28 may be arranged in a predetermined pattern with respect to the first and second connector bases 48, 50 and connected thereto by, for example, exothermic welding to ensure the electrical integrity of the connection prior to casting the insulating member 52 around the components. In this way, the connector component 42 becomes installable as a unit together with the down conducting system 26.

The insulating member 52 is sandwiched between an interior of the leeward surface 14 and an interior of the windward surface 16. Adhesive (not shown) is located between the insulating member 52 and the interiors of the leeward and windward surfaces 14, 16 to bond the insulating member to the interior of the blade. It should be appreciated that FIG. 3 shows a cross section through the insulating member 52 and that the first connector base 48, the second connector base 50 and the conductive link 56 are fully encapsulated by the insulating member 52. The insulating member 52 may have a width in the span-wise direction of around 15 cm.

Turning to FIG. 4, here is shown a section through one of the connector arrangements 40 on the trailing edge 12 of the blade 2. In a similar manner to the connector arrangement 40 in FIG. 3, the connector arrangement 40 shown in FIG. 4 also includes a block-like connector component 60 that connects to a first connector element 62 associated with the leeward surface 14 and a second connector element 64 associated with the windward surface 16.

However, here the connector component 60 comprises a single connector base 63 with which the connector elements 62, 64 engage, and an insulating member 66 that encapsulates the connector base 63. The connector base 63 includes a corresponding recess 68 through which the trailing edge down conductor 30 is routed so as to connect the connector bases 63 into the down conducting system 26. Therefore, the encapsulation of the connector base 63 also encapsulates the junction between the down conducting system 26 and the connector base 63.

Each connector element 62, 64 is in the form of a bolt having a head 62a, 64a and a shank 62b, 64b. The shanks 62b, 64b extend into the blade 2 and engage into a threaded socket 70 in the connector base 63. The heads 62a, 64a lie against and are countersunk into the blade shell so that an upper face of the heads 62a, 64a are flush with the surrounding surface of the blade 2.

Since the connector component 60 is installed in region of the blade 2 that has a relatively shallow depth, preferably the connector elements 62, 64 are joined to the connector base 63 so as to be offset from one another or 'staggered', as is shown in FIG. 4. This avoids the shanks 62b, 64b of opposing connector elements 62, 64 contacting one another when installed.

The insulating member 66 is sandwiched between an interior of the leeward surface 14 and an interior of the windward surface 16. Adhesive (not shown) is located between the insulating member 66 and the interiors of leeward and windward surfaces 14, 16 to bond the insulating member to the interior of the blade. It should be appreciated that FIG. 4 shows a cross section through the insulating member 66 and that the connector base 63 is fully encapsulated by the insulating member 66. The insulating member 66 may have a width in the span-wise direction of around 15 cm.

As has been mentioned above, the head of the connector elements 44, 46, 62, 64 defines an electrical coupling or interface between the surface protection layer 20 and the respective connector component 42, 60. The surface protection layer 20 and, in particular, the electrical connection between it and the connector elements will now be described with reference to FIGS. 5 and 6.

Figure 5:
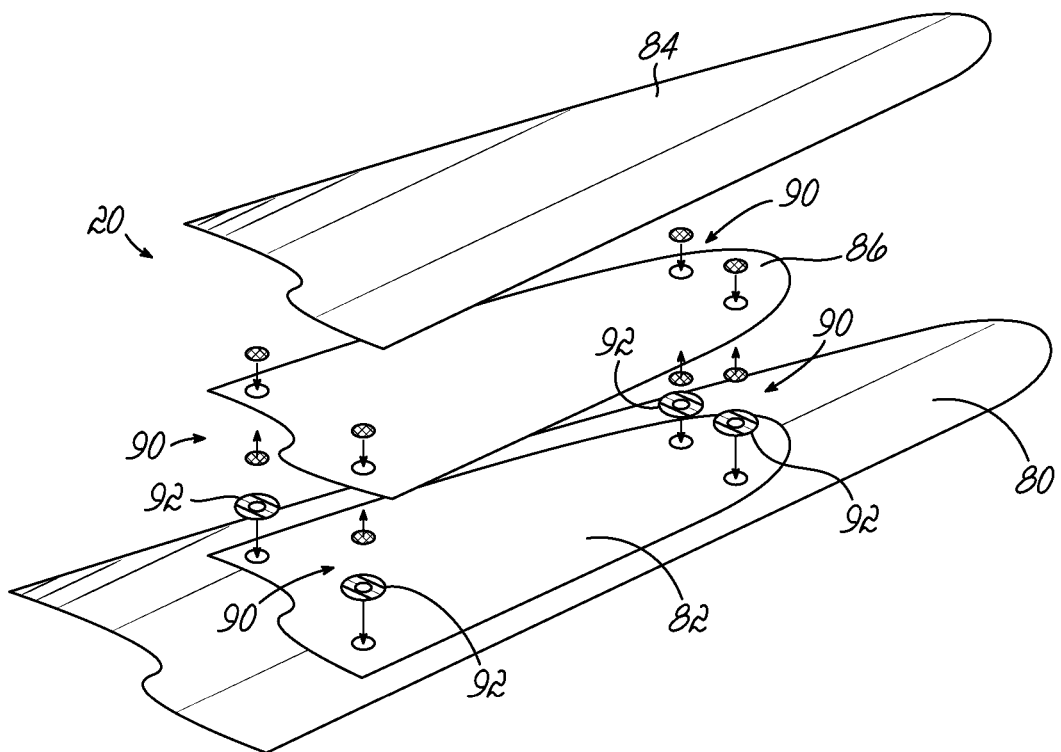
FIG. 5 is an enlarged perspective view of a surface protection layer in exploded format.

In overview, and as has been mentioned, the surface protection layer 20 incorporates a conductive layer currently envisaged to be expanded aluminium foil. In FIG. 5, the surface protection layer 20 is shown in exploded view for clarity against a blade mould surface portion 80. The surface protection layer 20 includes three main components: an outer insulating layer 82, an inner insulating layer 84 and a conductive layer 86 sandwiched between the insulating layers 82, 84.

Both the outer insulating layer 82 and the inner insulating layer are glass fibre fabric. The outer insulating layer 82 becomes the outer surface or skin of the blade 2 once the blade 2 is fully fabricated. Therefore it is preferred that the outer insulating layer 82 is a relatively lightweight fabric, for example less than 200 gsm, so as not to inhibit the formation of leaders from the conductive layer 86 during lightning conditions. The thin outer layer also reduces the risk of surface damage during a strike. Conversely, since it is desirable to insulate in-board from the surface protection layer 20, the weight of the inner insulating layer 84 is heavier, for example around 600 gsm, although these values should not be considered limiting.

In order to promote a good electrical contact between the conductive layer 86 and the connector elements, the conductive layer includes reinforced zones, identified in FIG. 5 generally as '90'. The reinforced zones 90 serve to strengthen the conductive layer 86 in localised regions by thickening the metal foil in some way. For example, the conductive layer 86 may undergo a soldering or casting process to solidify the expanded foil in localised regions. Alternatively, one or more conductive elements in the form of plates, discs or the like are bonded to the conductive layer 86 in the required zones. Bonding may be by way of brazing for example.

In each reinforced zone 90, a forming element 92 is applied to the outer insulating layer 82 prior to the lay down of the conductive layer 86. As will be described, the forming element shapes the conductive layer 86 during blade fabrication to provide a recess for receiving a respective connector element, as will now be described with reference to FIG. 6 which is an enlarged view of region 'A' in FIG. 3 and so shows the surface protection layer 20 in situ. The insulated forming element also prevents unwanted lightning strike attachment points adjacent to the connector bolts, thus preventing the surface protection layer from being damaged.

Here, the surface protection layer 20 is shown as defining the leeward surface 14 of the blade 2 together with a set of structural blade components 96 with which the surface protection layer 20 is integrated during a resin infusion and curing process. The structural blade components 96 may include further fabric layers, foam core sections and the like, as would be known to a person skilled in turbine blade design.

The insulating member 52 is bonded to the structural blade components 96 by a layer of adhesive (not shown).

The forming element 92 is an outwardly-tapered annular disc that includes an inner aperture 98 defining an inner wall 100. The forming element is preferably a polymeric part, particularly polyurethane. The forming element 92 sits inboard of the outer insulating layer 82 such that the layer 82 extends over a flat outer face 92a of the forming element 92 and terminates at an aperture 101 aligned with the inner wall 100. Note, however, that the outer insulating layer 82 may instead terminate at the outer edge of the forming element 92.

The conductive layer 86 is in-board of the outer insulating layer 82 and is positioned such that a reinforced zone 90 thereof is in registration with, or 'superimposed' on, the aperture 98 of the forming element 82. Here, the reinforced zone 90 includes first and second metal discs 102 that are cast onto either side of the conductive layer 86.

The dished or domed shape of the forming element 92 raises the level of the reinforced zone 90 so that it defines a recessed base 104 adjacent the inner wall 100 of the forming element 92. The recess defined by the base 104 and the inner wall 100 has a depth that matches with the depth of the head 44a of the connector element 44. Therefore, the underside of the head 44a abuts the reinforced zone 90 and the upper face of the head 44a lies substantially flush with the surrounding blade surface 14. To optimise the electrical contact between the head 44 and the reinforced zones 90, the faying surfaces thereof may be machined to an appropriately fine surface finish. This helps to avoid arcing during current transfer between the conductive layer 86 and the connector element 44.

The shank 44b of the connector element 44 extends through a bore 103 provided through the reinforced zone 90 and the structural components 96 so as to engage with the connector base 48 of the connector element 52 that is mounted adjacent the inside surface of the blade 2.

The surface protection layer 20 could be built up in a step-by-step process during fabrication of the blade 2 or, alternatively, the surface protection layer 20 could be provided as a preformed component that can be laid-up as a unit onto a blade mould.

One embodiment of a method for assembling a blade incorporating the surface protection layer 20 will now be described with reference to FIGS. 7a to 7e. As illustrated schematically in FIG. 7a, a blade mould 109 having a surface 110 is provided as an initial step. Although not shown here, a blade mould is typically provided as two mould halves in which two half shells are formed. Once the half shells have been fabricated, the two mould halves are brought together and the half shells are joined thus completing the shell of the blade 2.

Figure 6:
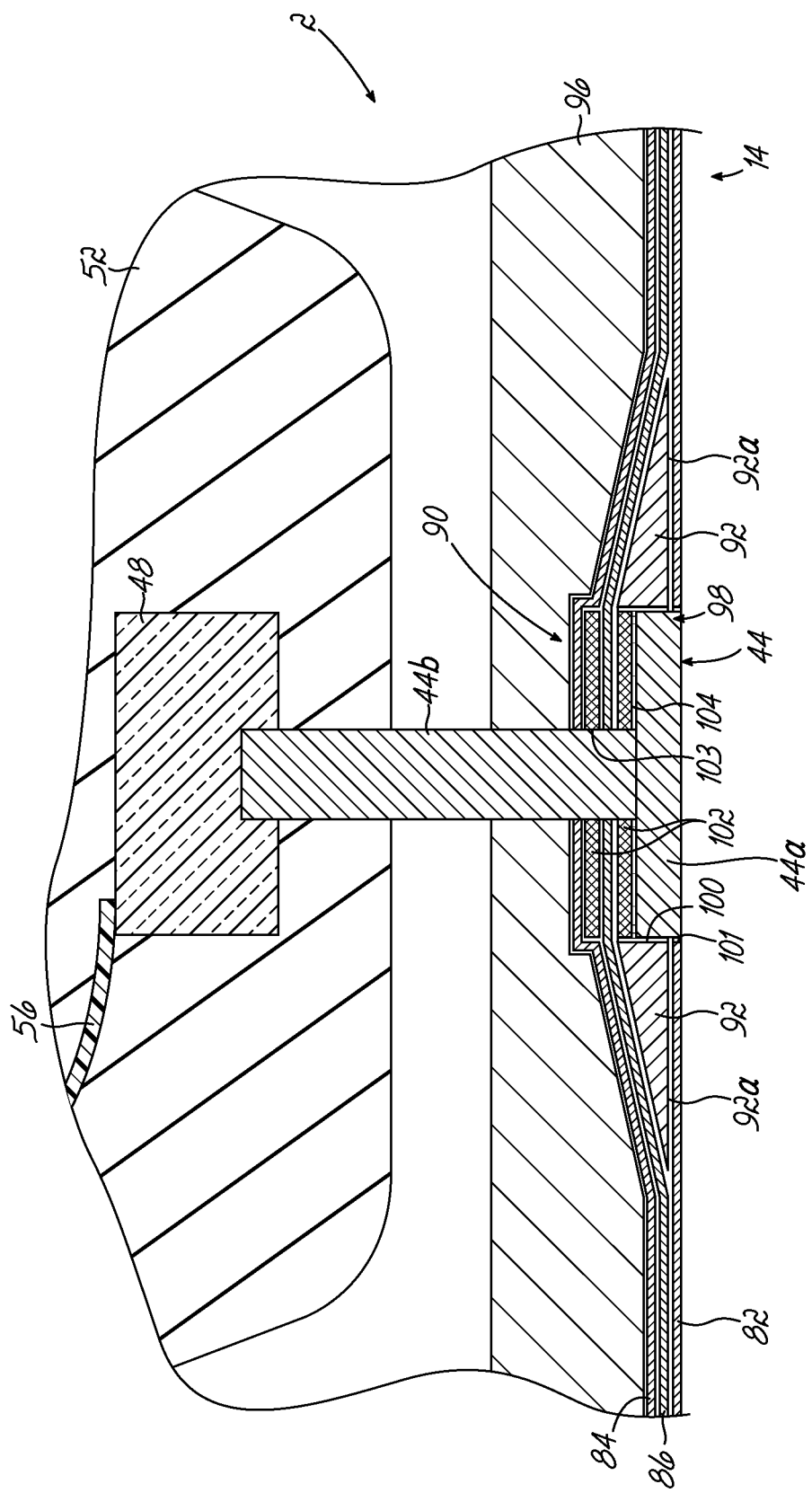
FIG. 6 is an enlarged view of the region A indicated on FIG. 3.
Figure 7A:
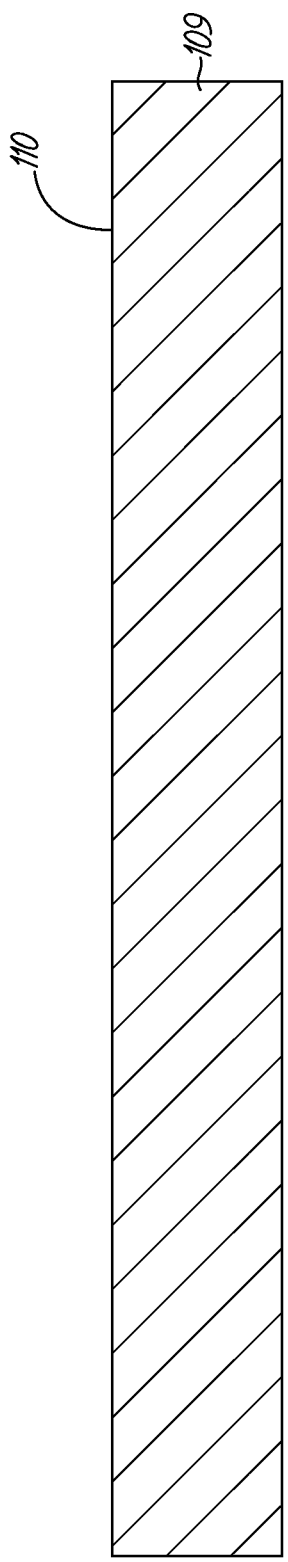
FIGS. 7a to 7e illustrate a series of fabrication steps for a wind turbine blade shell incorporating a surface protection layer.
Figure 7B:
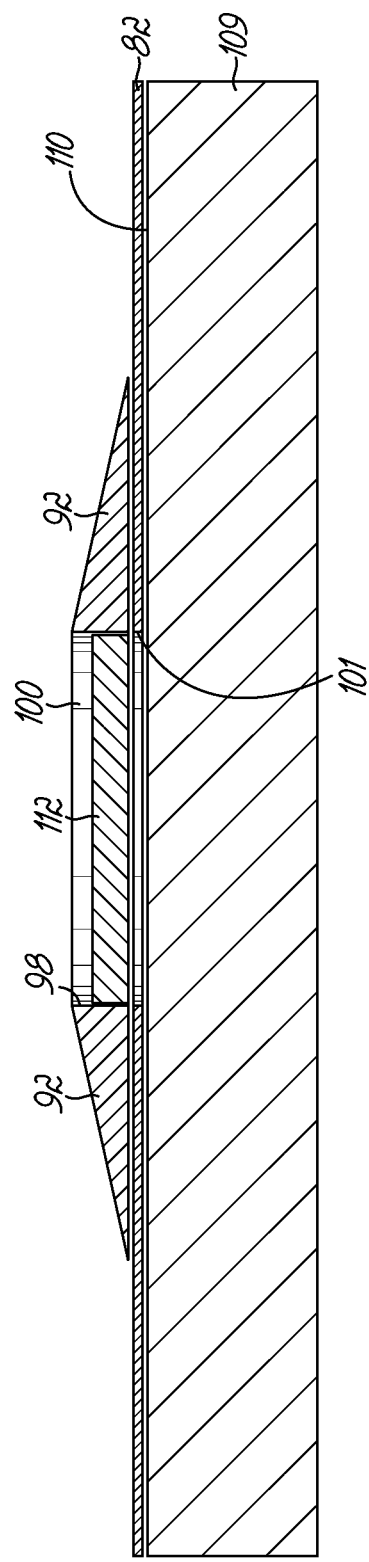

Turning to FIG. 7b, the outer insulating layer 82 and the forming element 92 are provided on the mould surface. As in FIG. 6, the outer insulating layer 82 has an aperture 101 that lines up with the inner wall 100 of the forming element 92. Here, the forming element 92 includes a plug member 112 that sits tightly inside the aperture 98 of the forming element 92. The plug member 112 is preferably a polymeric part and serves two main purposes. Firstly, it defines the position of the recessed base 104, as shown in FIG. 6, and so for this reason it has substantially the same shape and dimensions as the head 44a of the connector element 44. Secondly, by plugging the aperture 98 it ensures that the conductive surface of the reinforced zone 90 of the conductive layer 86 remains free of resin during the resin infusion process.

Figure 7C:
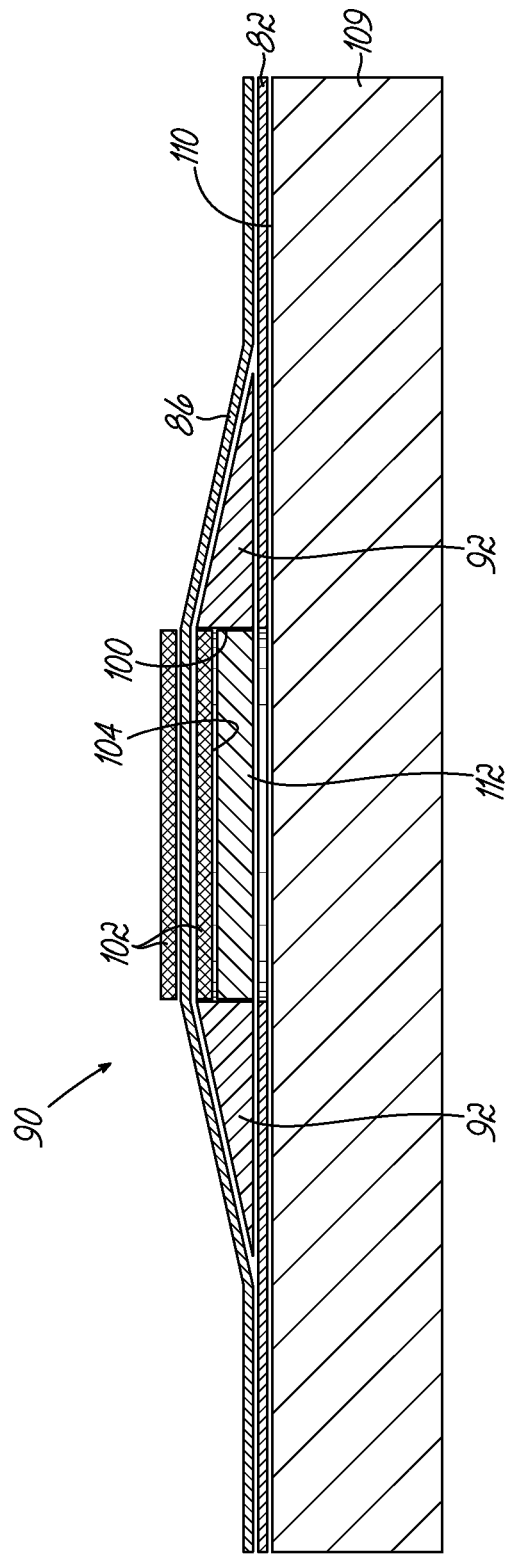

In FIG. 7c, the conductive layer 86 is shown laid-up on the forming element 92. It will be appreciated that the majority of the conductive layer 86 is substantially planar, although the (or each) forming element 92 shapes a localised region of the conductive layer 86, and particularly the reinforced zone 90 over its outer profile. Here it can be seen that one of the conductive discs 102 of the reinforced zone sits onto the plug member 112 thereby defining the recessed base 104 of the inner wall 100. Note that the conductive layer 86 has been provided as a preformed component with the conductive discs 102 pre-cast onto appropriate regions.

Figure 7D:
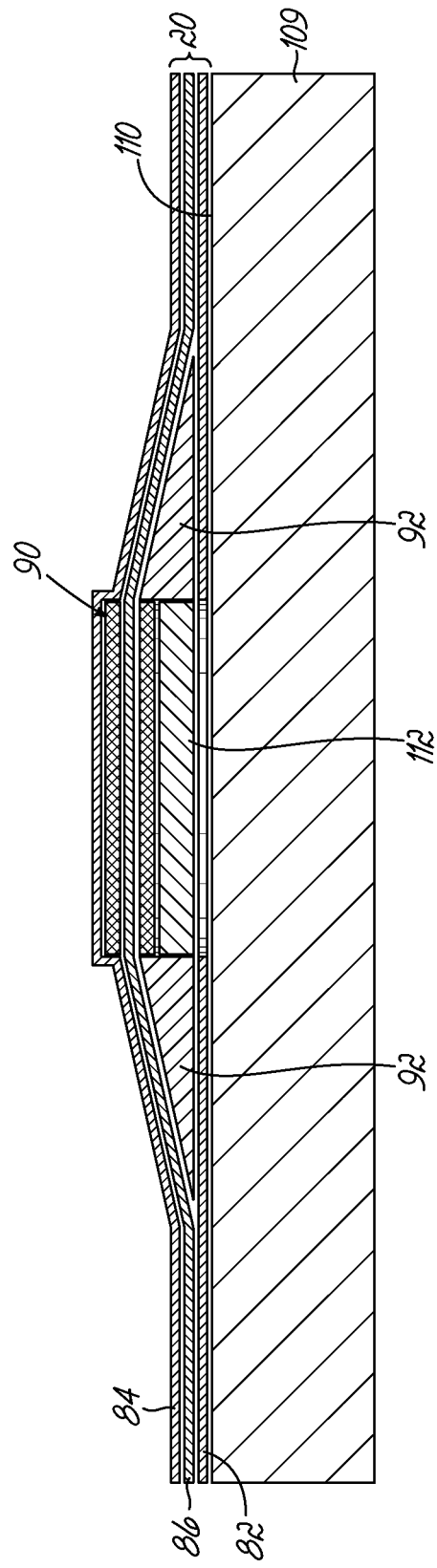
Figure 7E:
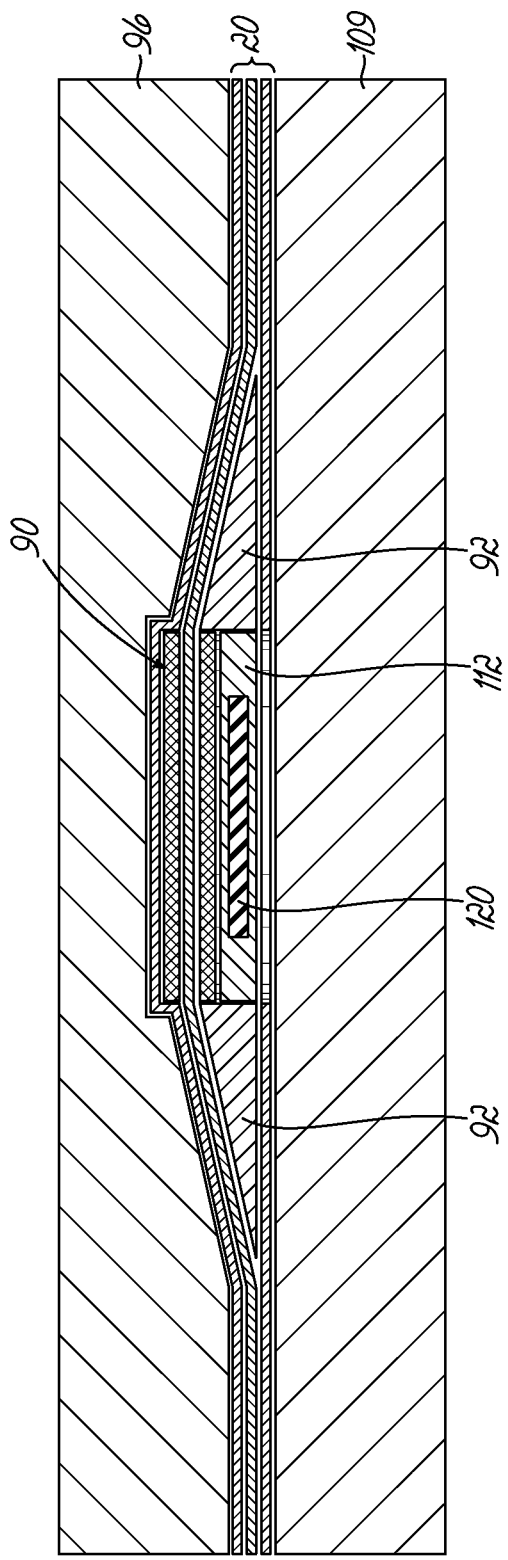

To finish the surface protection layer 20, as shown in FIG. 7d, the inner insulating layer 84 is laid down on top of the conductive layer 86. The inner insulating layer may be provided with a tackified surface so that it adheres to the conductive layer 86 prior the resin infusion process. Following this the half shell is laid-up by arranging the structural components 96 over the surface protection layer 20, as is illustrated in FIG. 7e. It should be noted that the structural components are shown here schematically and may include one or more glass fibre fabric layers, foam cores or spar caps. Once completed, the whole lay up is covered with an airtight bag that forms a sealed region over the components. The sealed region may then be evacuated using a vacuum pump, following which liquid resin is introduced into the sealed region so that it may flow through a series of channels to allow the resin to infuse completely through the lay up.

Once the resin has infused through the lay up, the vacuum pump continues to operate during the subsequent curing process in which the mould may undergo controlled heating to cure the blade half shell effectively.

During the resin infusion process, the component layers of the surface protection layer 20 are fixed in position and, in particular, the reinforced region 90 is set as the recessed base 104 of the aperture 98. After curing, and removal of the part from the mould, the plug member 112 is removed, thereby exposing the underlying reinforced zone 90 of the conductive layer 86. In order to locate the plug member 112 within the half shell, its position may be recorded so that it is readily locatable once the moulding is complete. Alternatively, the plug member 112 may incorporate an appropriate locator mechanism 120 which in this embodiment is a magnet 120 encased within the plug member 112. Since the plug member 112 ensures that the reinforced region 90 of the conductive layer 86 remains substantially free from resin during the infusion process, once removed the connector element 44 may be inserted through a suitable bore drilled through the half shell so as to connect up to as associated connector arrangement 40, as is shown in FIG. 6.

Manufacturing benefits may be achieved by forming the first and second insulating layers 82, 84 and the conductive layer 86 as a preformed component, as will now be explained with reference to FIGS. 8a to 8d. The same reference numerals will be used for consistency.

In previous embodiments, as shown in FIG. 5, the conductive layer 86 has been illustrated as a single sheet. However, in FIG. 8a the conductive layer 86 is shown as a pattern of rectilinear conductive layer portions, indicated generally as 202, arranged to be overlapped with one another, as will be explained.

The pattern of conductive layer portions 202 includes two main portions 202a and two side portions 202b. Each of the portions 202a, 202b includes first and second folded end regions 204. The folded end regions 204 serve to avoid any loose ends protruding from the expanded metal foil and increases current carrying capacity. Furthermore, the corners of the conductive layer portions may be formed with a radius to avoid sharp corners which may otherwise be vulnerable to lightning attachment.

The two main portions 202a are provided with a reinforced region 90 at each of their folded ends, resulting in four reinforced regions 90 in total. The reinforced regions 90 may be formed by casting metallic discs onto the main portions 202 in the manner described above with reference to FIGS. 7a-7e.

Figure 8A:
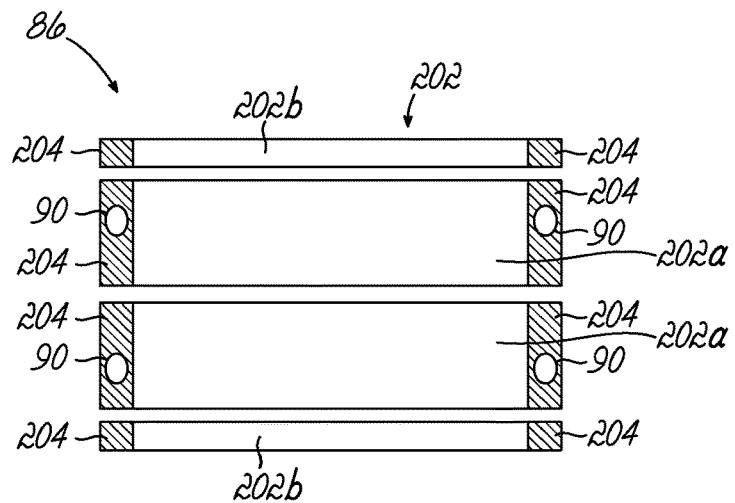
FIGS. 8a to 8d illustrate series of fabrication steps for a preformed component of a surface protection layer.
Figure 8B:
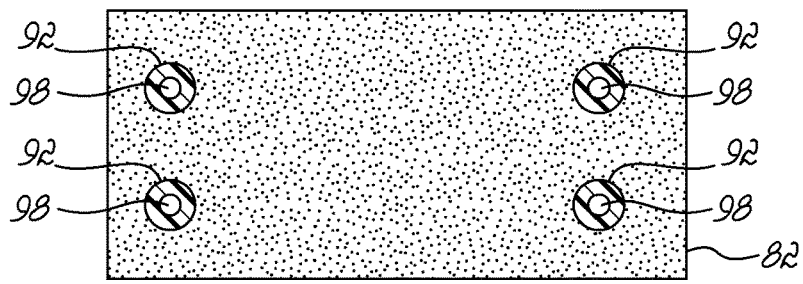

With reference to FIG. 8b, the pattern of conductive layer portions 202 are to be overlaid on a first insulating layer 82 which, as has been described above, is a glass fibre fabric. Since this layer 82 will form the outermost skin of the blade, preferably this fabric layer is relatively lightweight to avoid suppression of lightning leaders emanating from the conductive layer and to minimize surface damage during a strike 86. The first insulating layer 82 is provided with four forming elements 92 located in positions so that they overlay the apertures 98 in the insulating layer 82. As an alternative to this, the forming elements 92 may be applied directly to the reinforced regions 90 on the conductive layer 86 so that they are superimposed thereon.

The pattern of conductive layer portions 202 are then overlaid on the first insulating layer 82 in an overlapping manner. Firstly, the two main portions 202a are overlapped slightly with one another along their long edges, in the order of a few centimetres, to define a central margin of overlap 208. Then, the two side portions 202b are overlaid either partially or completely on the outer long edges of the main portions 202a, which provides two outer margins of overlap 210.

The assembled conductive layer 86 may then be stitched in place on the first insulating layer 82 to ensure that it is held securely in position. Alternatively, the first insulating layer 82 may be provided with a tackified surface so that the conductive layer portions 202 self-adhere to the first insulating layer 82. The surface of the first insulating layer 82 may be tackified by the application of a suitable pressure sensitive adhesive. Tackified glass fibre fabrics are available commercially.

Figure 8C:
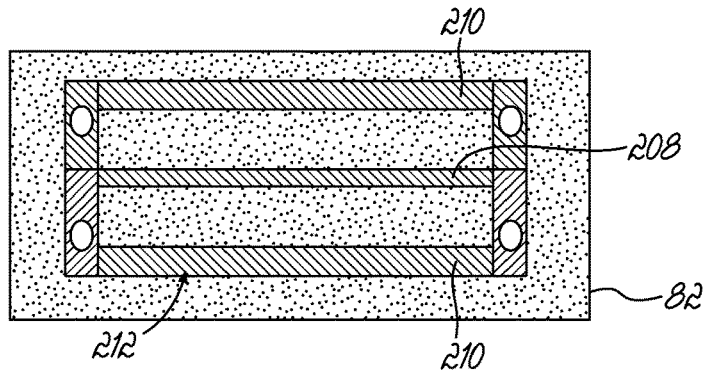

By observing the completed conductive layer 86 as shown in FIG. 8c, it can be seen that it is provided with a high capacity current channels 212 by virtue of the folded regions 204 and the margins of overlap 208, 210. The channel 212 extends about the perimeter of the conductive layer 86, and also longitudinally through the centre of the layer 86. The channel 212 is beneficial in directing the energy from a lightning strike from the relatively thin regions of the conductive layer 86 along the channel 212 and to the reinforced regions 90 at which points the conductive layer 86 is coupled to the down conductive system 26 via the connector elements as discussed above.

Figure 8D:
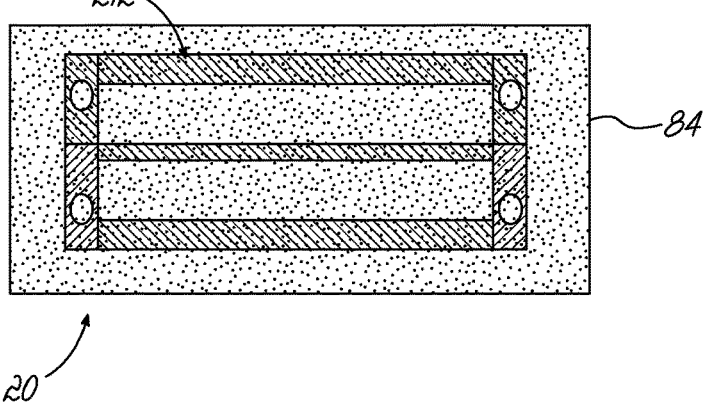

Finally, and with reference to FIG. 8d, a second insulating layer 84 is applied on top of the conductive layer 86 so as to sandwich the conductive layer 86 between it and the first insulating layer 82. The second insulating layer 84 may be stitched to the first insulating layer 82 and/or the conductive layer 86 in order to secure all of the layers together. Alternatively, the faying surface of the second insulating layer 84 may also be tackified with a suitable adhesive.

It should be noted that in FIGS. 8a to 8d the conductive layer 86 and the insulating layers 82, 84 are shown in simplified form to illustrate the concept for the purposes of this description and, as such, they are not necessarily representative of actual size or scale with respect to a wind turbine blade.

The completed surface protection layer 20, as shown in FIG. 8d, therefore incorporates all components it needs to be laid up in a blade mould. This makes the assembly process simpler since the surface protection layer 20 can be applied to the mould as a single unit instead of needing to be laid-up in a step by step process in which each of the constituent layers needs to be aligned accurately.

It will be appreciated from the above discussion that the surface protection layer 20 is equipped with measures to make it able to manage frequent high energy lightning strikes. For example, the reinforced regions 90 strengthen the conductive layer 86 in regions where it connects to the down conductor system 26. Furthermore, the current channel 212 provides a means to manage the energy flow path through the conductive layer 86 which increases the robustness of the conductive layer. However, it will be appreciated that the preforming process as described above could also be applied to a more simple surface protection layer 20 including a single sheet of metallic conductor, expanded metal foil, for example, sandwiched between first and second glass fibre fabric layers.

Some variants to the specifics embodiments shown in the drawings have been described above. Others will be apparent to the skilled person and some will now be explained by way of example.

The specific embodiment of the surface protection layer 20 is shown as having four points of contact between it and the down conducting system 26 of the blade 2. This is driven in part by the fact that the down conducting system 26 includes two down conductors 28, 30 that run the length of the blade near to the leading and trailing edges. However, although having four points of contact is beneficial, in terms of energy sharing during a lightning strike for example, it is not essential and the surface protection layer 20 may be provided with less than four points of contacts. One or two points of contact may be sufficient in the case where the blade is provided with a single down conductor.

The forming element 92 has been described above as having a plug element 112 which incorporates a magnet which assists technicians in locating the forming element after the blade has been removed from its mould. It will be appreciated that this is one way to provide the forming element with locating means, and that other ways are possible. For example, a simple metallic inset could be located by a suitable hall sensor, for example. Other means include the use of RF transponders. Furthermore, it will be appreciated that the locating means could be incorporated into the outer part of the forming element instead of the plug member.

In the above embodiments, it has been described that the blade is divided into three zones, A, B, and C, for the purposes of lightning protection. It will be appreciated that this is merely an example of how a blade may be configured for lightning protection and is not intended to be limited. For example, a blade may be configured so that zone A is omitted. In effect, therefore, the blade is protected along its entire length instead of leaving a zone relatively unprotected from lightning strikes.

The invention claimed is:

1. A method of making a wind turbine blade component incorporating a lightning protection system, the method comprising:
   providing a mould surface;
   arranging a forming element on the mould surface;
   providing an electrically conductive layer;
   reinforcing the electrically conductive layer in a predetermined region to create a reinforced zone;
   arranging the electrically conductive layer over the forming element so that the reinforced zone is superimposed on the forming element;
   arranging one or more structural components on the electrically conductive layer;
   consolidating the structural components under vacuum to form a blade shell having an integrated electrically conductive layer adjacent an outer surface of the shell;
   removing at least part of the forming element from the blade shell to define a recess in the outer surface of the shell so as to expose the reinforced zone of the electrically conductive layer; and
   electrically connecting the electrically conductive layer at the reinforced zone to a respective electrical component located adjacent an inner surface of the blade shell,
   wherein the removed part of the forming element forms no part of the lightning protection system during use.

2. The method of claim 1, wherein the electrically conductive layer having a reinforced zone is provided as a preformed component for arranging on the mould.

3. The method of claim 1, wherein the electrically conductive layer and the forming element are provided together as a preformed component for arranging on the mould as a unit.

4. The method of claim 1, wherein the reinforced zone on the electrically conductive layer includes applying a first conductive element to a first side of the conductive layer.

5. The method of claim 4, wherein the reinforced zone on the electrically conductive layer includes applying a second conductive element to a second side of the conductive layer substantially in register with the first conductive element.

6. The method of claim 5, including fusing the first conductive element and/or the second conductive element to the electrically conductive layer.

7. The method of claim 5, wherein the first conductive element and the second conductive element each include a metallic plate.

8. The method of claim 1, wherein the forming element includes a removable element arranged to seal against the electrically conductive layer during consolidation of the structural components under vacuum.

9. The method of claim 8, wherein the forming element includes a locating means so that the position of the forming element within the blade can be determined.

10. The method of claim 1, wherein the conductive layer is a metallic screen.

11. The method of claim 10, wherein the metallic screen is a metallic mesh or an expanded metal foil.

12. The method of claim 1, including reinforcing the conductive layer in a plurality of predetermined regions.

13. The method of claim 1, wherein electrically connecting the conductive layer to a respective electrical component includes receiving a connector element through the conductive layer, the connector element having a substantially flat face for mating with a correspondingly flat surface of the reinforced zone.

14. A preformed component for a lightning protection system of a wind turbine blade formed in a wind turbine blade mould, wherein the preformed component comprises:
   a conductive layer;
   reinforcing means arranged to reinforce the conductive layer in one or more discrete reinforced zones, wherein the reinforcing means includes at least one reinforcing element applied to the conductive layer in a respective one or more locations so as to form the one or more reinforced zones; and one or more forming elements applied to the conductive layer superimposed on a respective one of the reinforced zones, wherein the one or more forming elements is an annulus defining an aperture to provide an access point to the underlying conductive layer, wherein at least a portion of the at least one reinforcing element extends within the aperture of the one or more forming elements, and wherein the preformed component is configured to be positioned in the mould as a unit.

15. The preformed component of claim 14, wherein the or each reinforcing element is applied to the conductive layer so as to be integral therewith.

16. The preformed component of claim 15, wherein the or each reinforcing element is fused to the conductive layer.

17. The preformed component of claim 14, wherein the or each reinforcing element is a metallic plate.

18. The preformed component of claim 14, wherein the one or more forming elements includes a plug member received in the aperture to seal against the underlying conductive layer.

19. The preformed component of claim 14, wherein the conductive layer is a metallic foil.

20. The preformed component of claim 19, wherein the metallic foil is a mesh.

21. The preformed component of claim 19, there the conductive layer is an expanded metal foil.

22. The preformed component of claim 14, wherein the conductive layer is sandwiched between first and second insulating fabric layers.

23. A wind turbine blade comprising the preformed component of claim 14.

24. A preformed component for a lightning protection system of a wind turbine blade formed in a wind turbine blade mould, wherein the preformed component comprises:
a conductive layer;
reinforcing means arranged to reinforce the conductive layer in one or more discrete reinforced zones; and
one or more forming elements applied to the conductive layer superimposed on a respective one of the one or more reinforced zones, wherein the one or more forming elements includes locating means so that the position of the one or more forming elements can be determined, and
wherein the preformed component is configured to be positioned in the mould as a unit.

25. The preformed component of claim 24, wherein the one or more forming elements is magnetised.

26. A method of making a wind turbine blade component incorporating a lightning protection system, the method comprising:
providing a wind turbine blade mould having a mould surface;
providing a preformed component, the preformed component including a conductive layer including reinforcing means arranged to reinforce the conductive layer in one or more discrete reinforced zones;
positioning the preformed component on the mould surface as a unit;
forming a blade shell in the mould so as to have the conductive layer adjacent an outer surface of the blade shell; and
electrically connecting the conductive layer to an electrical component adjacent an inner surface of the blade shell by inserting a connector element through the conductive layer, the connector element having a first portion open to the outer surface of the blade shell and a second portion contacting the electrical component.

27. The method of claim 26, wherein the preformed component further comprises one or more forming elements applied to the conductive layer superimposed on a respective one of the reinforced zones.

* * * * *